Aug. 29, 1933.  E. G. GRIFFITH  1,924,432
WASHER BRUSH AND HOLDER
Filed Oct. 24, 1930
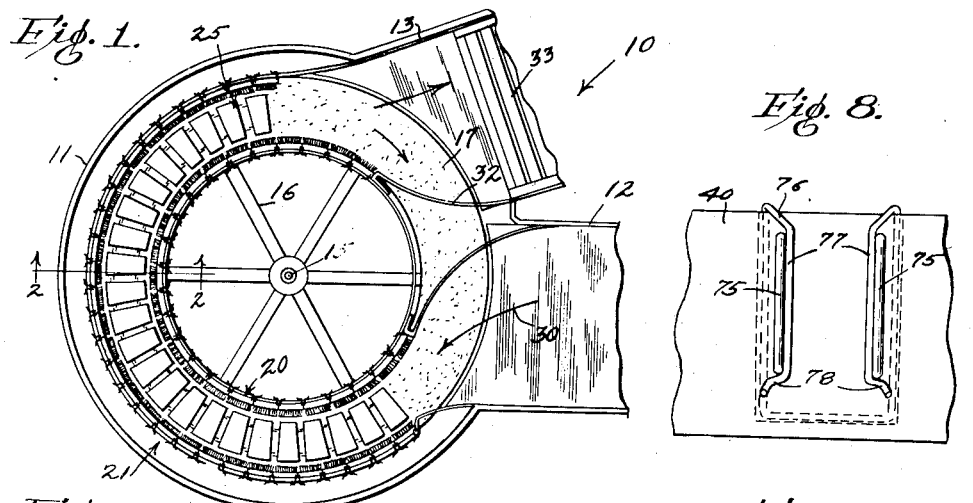
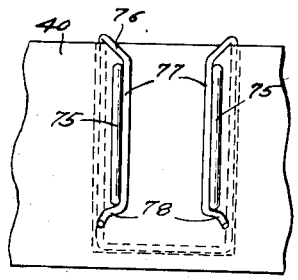
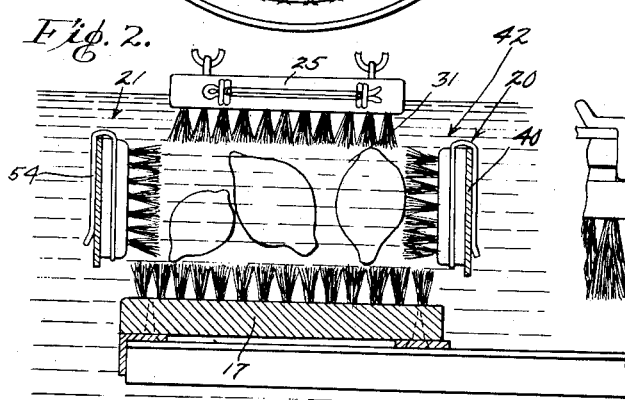
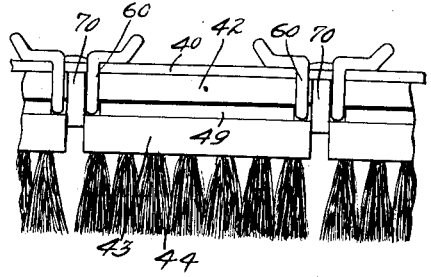
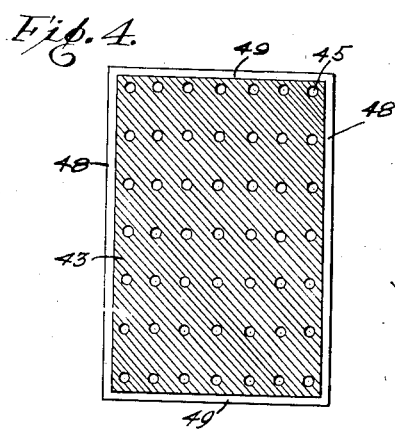
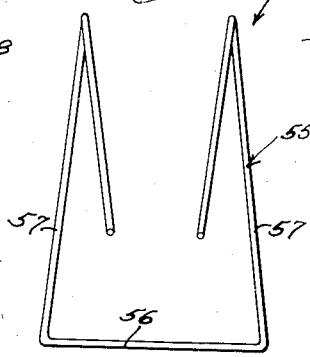
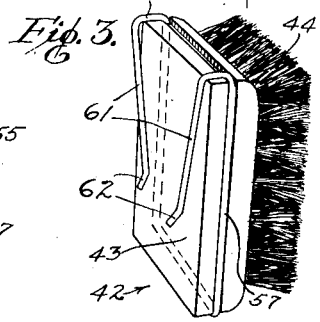
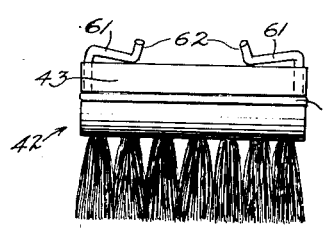
Inventor:
EARL G. GRIFFITH
By
Attorney.

Patented Aug. 29, 1933

1,924,432

UNITED STATES PATENT OFFICE 1,924,432

WASHER BRUSH AND HOLDER

Earl G. Griffith, Los Angeles, Calif.

Application October 24, 1930. Serial No. 490,930

9 Claims. (Cl. 146—199)

My invention relates to brushes and brush holders and is particularly adapted for use in a commercial fruit washer.

In the citrus industry in the United States, machines of several different types are extensively used for washing oranges, lemons and grapefruit. Some of these machines use a wall covered with brushes for contacting and scrubbing the fruit as it is fed along this wall. Particularly is this true in the Corey type of lemon washer and the Ofstad cone-disc orange washer. Difficulty has been experienced hitherto in providing a satisfactory means for holding these brushes.

It is desired that the brushes be easily installed; that when installed they will be rigidly retained in position under the continuous vibration of the scrubbing action of the fruit, and finally, that when worn out the brushes may be quickly and easily removed.

It is accordingly an object of my invention to provide a brush embodying a holding means accomplishing the requirements noted above.

The manner in which the above objects are accomplished as well as further objects and advantages will be made manifest in the following description and the accompanying drawing in which:

Fig. 1 is a diagrammatic fragmentary plan view of a Corey fruit washer 10 embodying my invention.

Fig. 2 is a fragmentary enlarged cross sectional view taken on the line 2—2 of Fig. 1.

Fig. 3 is a perspective view of a preferred embodiment of the brush and brush holder of my invention.

Fig. 4 is a vertical sectional view taken on the line 4—4 of Fig. 3.

Fig. 5 is a bottom plan view of the brush and brush holder shown in Fig. 3.

Fig. 6 is an elevational view of the brush holder shown in Fig. 3 when removed from the brush.

Fig. 7 is a plan view of a plurality of brushes mounted upon a modified form of support.

Fig. 8 is a rear elevational view of a modified form of brush and brush holder mounted upon another modified form of support.

The washer 10 includes a tank 11 which is enlarged to form a feed tank 12 and a discharge tank 13 each of which connect directly with the tank 11. Mounted on a shaft 15, supported in suitable bearings, and adapted to be rotated in a horizontal plane is a brush wheel 16 having an annular brush 17 disposed upwardly. Supported on an overhead frame (not shown) is an inner annular brush wall 20 and an outer semi-annular brush wall 21. Also hanging loosely from this support is a series of overhead brushes 25 which are hinged together as shown in Fig. 1. In operating the washer 10 the tanks 11, 12 and 13 are filled with water as indicated in Fig. 2, the wheel 16 is rotated and fruit is floated onto the brush 17 in the direction of the arrow 30 and carried along a semi-annular channel 31 formed between the brushes 17, the brush walls 20 and 21, and the overhead brushes 25 to a point where the fruit is swept from the brush 17 by a guide wall 32 into the discharge tank 13 where it is picked up by a discharge elevator 33 and delivered onto a sorting table.

The present invention relates particularly to a brush embodying holding means which is particularly adapted to be assembled to provide a wall suitable for use as one of the brush walls 20 or 21. These walls are both constructed in the same manner and each includes a support member 40 which is preferably formed of sheet metal and rigidly supported on the frame of the washer 10. Adapted to be installed on these supports are individual brushes 42 each of which includes a brush back 43 which is preferably formed of wood and has a bristle face 44 formed by a plurality of bristle tufts secured in a suitable manner in holes 45 provided in the back 43. Extending along opposite edges of the back 43 are channels 48. These are connected at their adjacent ends by channels 49 formed in upper and lower edges of the back 43. Associated with each brush 42 is a holder 54 which is preferably formed of spring wire and has a U-shaped body 55 including a bottom portion 56 and side portions 57. The upper ends of the side portions 57 are bent rearwardly to form dogs 60 and support clamping arms 61, lower ends 62 of which are curved outwardly as shown in Figs. 2 and 3. As shown in Fig. 6, the side portions 57 of the U-shaped body 55 are normally inclined inwardly. These are adapted to be stretched apart to receive the back 43 of a brush 42. When the brush back has been slid into the holder 54 so that the side members 57 are disposed in the side channels 48 and the bottom member 56 is disposed in one of the channels 49 the dogs 60 will snap in place over opposite corners of the brush back 43 and trap these corners until the side members 57 of the holder are spread apart to release the back from the dogs 60. It is also to be noted that the provision of channels 49 at opposite ends of the brush back 43 permits the brush to be inserted in the holder 54 with either end uppermost. This of course could be accomplished also without a channel at either end of the brush but it is preferable to provide the channels 49 so that these will receive the bottom holder member 56 and thus more securely unite the brush back 43 to the holder 54.

When the back 43 is thus slid in place in the holder 54 the combined brush and holder are adapted to be installed on the support member 40. This is accomplished by sliding the brush downwardly against the inner face of the support so that the turned up ends 62 of the clamp arms 61 ride easily over the upper edge of the support 40 until the dogs 60 rest downwardly on this edge and support the brush 42 in position as shown in Fig. 2.

It is to be noted that when thus positioned the brushes 42 are positively prevented from dropping downwardly by the holder 54, the brush resting directly on the bottom member 56 of the holder, and the holder being supported positively by direct engagement of the dogs 60 with the upper edge of the support 40.

It is preferable to have the brushes 42 disposed in contact with each other along the inner surfaces of the supports 40 so that wobbling of the brushes on the supports 40 is prevented. Where the brushes are subjected to considerable vibration it may be found desirable to provide one or more projections such as fixed pins 70 so that these extend inwardly from the support 40 as shown in Fig. 7 so that there is just space enough between adjacent pairs of pins 70 to receive a single brush 42. It should be noted that pins 70 used in this manner would extend alongside opposite edges of each of the brushes 42 making up the brush wall so that side members 57 of each holder 54 would be positively retained in place in the side channels 48 of the brush back 43 with which they are associated. It is also noted that this prevents the dogs 60 from becoming unlatched from over the upper corners of the brush back 43.

In Fig. 8 I have illustrated another modified form of my invention in which the support 40 may have rearwardly outstruck portions 75 about which clamping arms 76 of the holder 54 are adapted to be locked. This locking is accomplished by the clamping arms 76 being bent sharply inwardly and having parallel portions 77 terminating in hooks 78, the latter hooking about lower ends of the outstruck portions 75. The modified form of holder and support shown in Fig. 8 locks the holder onto the support until a portion of the holder is sprung to permit it to be unlocked from the support. It is to be noted that the brush and brush holder of my invention embody many advantages including the provision of a very inexpensive means of securing the brushes 42 to the supports 40 as well as a means which permit the brushes to be quickly installed and as quickly removed when necessary to replace a worn out brush, and also a means which under no circumstances will protrude inwardly beyond the brush back so that it might possibly engage and injure the fruit passing through the washer 10. It is particularly to be noted that this brush and brush holder may be used in any place where it is desired to secure the brush back to a support member in a similar manner to that illustrated herein. It is particularly suitable in any machine where practically vertical brush walls such as the walls 20 and 21 are required.

I claim as my invention:

1. In a fresh fruit washer, the combination of: a support; a brush having a back, there being channels formed in opposite edges of said back; and a holder including a length of spring wire bent in a U-shape, the side portions of said U yieldably extending into said channels, the ends of said portions being rebent to form gripping arms for attaching said back to said support.

2. A combination as in claim 1 in which a recess is formed in said back between adjacent ends of the aforesaid channels and adapted to receive the bottom cross portion of said U.

3. A combination as in claim 1 in which recesses are formed in opposite edges of said back between adjacent ends of the aforesaid channels, either of said recesses being adapted to receive the bottom cross portion of said U.

4. A combination as in claim 1 in which projections are formed upon said support and extend therefrom into contact with said holder when said brush is positioned on said support, to retain said holder U side portions in said channels.

5. A combination as in claim 1 in which projections are formed from said support to determine the position of said gripping arms by contacting these when said holder is applied to said support.

6. A combination as in claim 1 in which said gripping arms have hooks provided thereon, there being formations provided on said support with which said hooks engage when said holder is positioned on said support to more rigidly position said brush on said support.

7. In a brush unit adapted for use in a fresh fruit washer in a substantially vertical position, the combination of: a brush back having grooves in its side edges; a spring wire base extending across the bottom edge of said back; spring wire brush gripping arms extending upward from opposite ends of said base under a tension which yieldably urges them into said grooves; and a pair of hooks rebent from upper ends of said arms for supporting said unit, said hooks yieldably pressing against said brush back.

8. A combination as in claim 1 in which projections are formed upon said support and extend therefrom alongside said brush, when the latter is positioned on said support, to retain said holder U side portions in said channels.

9. In a brush unit adapted for use in a fresh fruit washer in a substantially vertical position, the combination of: a brush back having grooves in its side edges; a spring wire base extending across the bottom edge of said back; spring wire brush gripping arms extending upward from opposite ends of said base under a tension which yieldably urges them into said groove; and means for supporting said unit from the upper ends of said arms, the upper end portions of said brush gripping arms being bent to overlie portions of said brush back so as to prevent the withdrawal of said back from said arms until said arms are sprung outwardly.

EARL G. GRIFFITH.